US009483155B2

(12) United States Patent
Wu et al.

(10) Patent No.: US 9,483,155 B2
(45) Date of Patent: Nov. 1, 2016

(54) POINTER UNIFICATION

(75) Inventors: Joyce Wu, Redmond, WA (US);
Krishnan Menon, Redmond, WA (US);
Mariel Young, Seattle, WA (US);
Olumuyiwa Durojaiye, Bothell, WA (US);
Reed Townsend, Kirkland, WA (US);
Todd Torset, Woodinville, WA (US);
Uros Batricevic, Redmond, WA (US);
Vipul Aneja, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1076 days.

(21) Appl. No.: 13/615,272

(22) Filed: Sep. 13, 2012

(65) Prior Publication Data

US 2014/0075372 A1 Mar. 13, 2014

(51) Int. Cl.
*G06F 3/048* (2013.01)
*G06F 3/0481* (2013.01)
*G06F 3/038* (2013.01)
*G06F 9/44* (2006.01)

(52) U.S. Cl.
CPC ............. *G06F 3/0481* (2013.01); *G06F 3/038* (2013.01); *G06F 9/4443* (2013.01)

(58) Field of Classification Search
CPC ..... G06F 3/0416; G06F 3/0481; G06F 3/038
USPC .................. 345/173; 715/781, 856
See application file for complete search history.

(56) References Cited

U.S. PATENT DOCUMENTS

| 5,694,150 A | 12/1997 | Sigona et al. |
| 2006/0267957 A1* | 11/2006 | Kolmykov-Zotov et al. ............... G06F 3/0416 345/173 |
| 2012/0023460 A1 | 1/2012 | Blumenberg |

OTHER PUBLICATIONS

Townsend, R., Build advanced touch apps in Windows 8—APP-186T; Build2011, Sep. 15, 2011.
Micelli, Vincenzo et. al., Design of Gestural Interfaces for Simulated Smart Environments, Adjunct Proceedings of 3rd European Conference on Ambient Intelligence (Aml09), Nov. 2009, pp. 231-234.
Westerman, Wayne. Hand Tracking, Finger Identification, and Chordic Manipulation on a Multi-Touch Surface, Dissertation, University of Delaware, Spring 1999.
Fukuchi, Kentarou. An Evaluation of Multiple Pointing Input Systems, INTERACT2001 Proceedings pp. 739-740, 2001.

* cited by examiner

*Primary Examiner* — Andrey Belousov
(74) *Attorney, Agent, or Firm* — Timothy Churna; Dan Choi; Micky Minhas

(57) ABSTRACT

Embodiments relate to a computing device having storage, a processor, a display, a first human input device, and a second human input device, where the first human input device is in a first category of human input devices and the second human input device is in a second category of human input devices. The computing device may perform a process involving executing a windowing environment that manages windows of applications executing on the computing device. The windowing environment may receive raw inputs from the first and second human input devices and in turn generate input pointers for the raw inputs, respectively. The input pointers may be or include instances of an input pointer class implemented by the windowing environment, the pointer class used by the windowing environment for arbitrary different types of human input pointer devices including the first human input device and the second human input device.

20 Claims, 7 Drawing Sheets

FIG. 4

Pointer Class  142

| Properties | Description |
| --- | --- |
| [get/set] Device(IPointerDevice) | The associated pointer device |
| [get/set] Point(point) | The location of the point |
| [get/set] PointerId(DWORD32) | The id for this pointer |
| [get/set] PointerFrameId(DWORD32) | The frame id containing this pointer |
| [get/set] Timestamp(DWORD32 *value) | The timestamp associated with this pointer |
| [get/set] InContact(boolean) | Whether the pointer is in contact with the screen |
| [get/set] IsFirstButtonPressed(boolean) | Whether the first pointer button is pressed |
| [get/set] IsSecondButtonPressed(boolean) | Whether the second pointer button is pressed |
| [get/set] IsPrimary(boolean) | Whether the pointer is primary |
| [get/set] IsInRange(boolean) | Whether the pointer is is range of the device |
| [get/set] IsFirstInRange(boolean) | Whether the pointer is newly detected |

| Methods | Description |
| --- | --- |
| HasProperty(PointerDevicePropertyIdentifier, bool) | Determines if a specified property exists on a pointer |
| GetPropertyValue(PointerDevicePropertyIdentifier, INT32) | Retrieves the specified property for a pointer |
| GetPropertyContactRect(Rect*) | Retrieves the contact rect |
| GetPropertyPressure(float*) | Retrieves the pointer pressure |
| GetPropertyOrientation(float*) | Retrieves the contact orientation |
| GetPropertyTwist(float*) | Retrieves the pointer twist (rotation of the barrel along the barrel axis for a pen) |
| GetPropertyTiltX(float*) | Retrieves the pointer Y tilt |
| GetPropertyTiltY(float*) | Returns the PointerDevicePropertyIdentifier for y location |

FIG. 5
Gesture Class 144

| Methods | Description |
|---|---|
| ProcessDown(IVector<PointerPoints>) | Processes pointer data from a pointer down message and associated history |
| ProcessMove(IVector<PointerPoints>) | Processes pointer data from a move message and associated history |
| ProcessUp(IVector<PointerPoints>) | Processes pointer data from an up message and associated history |
| ProcessInertia(time) | Processes inertia |
| ProcessMouseWheel(IVector<PointerPoints>) | Processes mouse wheel data |
| CompleteGesture() | Completes the current gesture and resets to not active |

| Properties | Description |
|---|---|
| [get/set] GestureSettings(GestureSettings) | Gesture configuration settings |
| [get] IsInertial(boolean) | Reports whether the gesture processor is current in an inertia state |
| [get] IsActive(boolean) | Reports if the GestureProcessor is current processing a gesture or inertia |
| [get/set] ShowGestureFeedback(boolean) | Enable/disable DWM gesture feedback for detected gestures |
| [get/set] PivotPoint(point) | Pivot point for single-finger rotation |
| [get/set] PivotRadius(double) | Pivot radius for single-finger rotation |
| various inertial-related properties | e.g., expansion, deceleration, translation, expansion, rotation angle, inertia expansion, etc. |
| [get/set] CrossSlideThresholds(crossslidethresholds) | Set/get the cross-slide gesture thresholds |
| [get/set] CrossSlideHorizontally(bool) | Set/get the axis upon which cross-slide functions. |

| Events | Description |
|---|---|
| Tap | tap has occurred |
| Hold | a pointer dwelled for a period of time |
| Drag | a drag ocurred |
| Manipulation | a manipulation occurred (e.g., an affine transform such as scale, translate, rotate, post-input inertial affine transform, etc.) |
| others | e.g, PressAndTap, ManipulationStarted, ManipulationUpdated, ManipulationIntertiaStarting, ManipulationInertiaComleted, CrossSlide, Toss, etc. |

PointerDevice Class 144

| Properties | Description |
| --- | --- |
| [get] Type(POINTER_DEVICE_TYPE) | Reports the pointer device type |
| [get] IsExternal(bool) | Reports if the pointer device is external or integrated |
| [get] MaxTouchContacts(UINT32) | Reports the maximum number of contacts a touch device supports |
| [get] SupportedProperties(IVectorView< PointerDeviceProperty>) | Retrieves the set of raw HID properties associated with this pointer |

PointerDevices Static Class 144A

| Methods | Description |
| --- | --- |
| GetPointerDevices(IVector<IPointerDevice> **devices) | Returns the list of pointer devices |
| GetPointerDevice(pointerID, IPointerDevice **device) | Returns the pointer device associated with a pointer id |
| ... | ... |

FIG. 6

POINTER UNIFICATION

BACKGROUND

The Human Interface Device (HID) standard is a protocol that allows human-operated input devices to send data to a host computer. HID is flexible regarding what information devices are allowed to report. Pointer devices (e.g., mice, pens, touch digitizers, etc.) all report x-y coordinates, but depending on the device, data such as pressure, tilt and contact geometry may or may not be reported. In addition, HID allows devices to report custom properties, effectively allowing them to include any arbitrary information. The fact that certain data may or may not be present makes it challenging for developers to write software that supports these devices. Often, a developer must write different sections of code to support different types of devices.

In addition, developers must contend with different user interface frameworks that use different coordinate systems which may be relative to the physical screen, the application window, UI elements within the window, or other reference frames. Keeping track of a variety of coordinate systems is tedious, and forces developers to write code differently based on the UI framework being used.

In addition, when performing gesture recognition, most gesture recognizers work on a full set of inputs. It has not been possible for a developer to code for basic gesture detection at the contact level without sacrificing the use of system-provided gesture recognition.

Finally, legacy applications may expect traditional mouse messages. Such applications may not expect device-neutral pointer messages containing mouse data; there has not been any way to support these applications while at the same time providing a mechanism that transforms generic pointer data into legacy mouse data in an efficient way.

Discussed below are techniques related to providing unified access to inputs (pointers) from pointer devices such as mice, touch surfaces, pens, or other input devices that allow a user to "point" in two or three dimensions.

SUMMARY

The following summary is included only to introduce some concepts discussed in the Detailed Description below. This summary is not comprehensive and is not intended to delineate the scope of the claimed subject matter, which is set forth by the claims presented at the end.

Embodiments relate to a computing device having storage, a processor, a display, a first human input device, and a second human input device, where the first human input device is in a first category of human input devices and the second human input device is in a second category of human input devices. The computing device may perform a process involving executing a windowing environment that manages windows of applications executing on the computing device. The windowing environment may receive raw inputs from the first and second human input devices and in turn generate input pointers for the raw inputs, respectively. The input pointers may be or include instances of an input pointer class implemented by the windowing environment, the pointer class used by the windowing environment for arbitrary different types of human input pointer devices including the first human input device and the second human input device.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

FIG. 4 shows an example of the pointer class.

FIG. 5 shows an example gesture class.

FIG. 6 shows an example of the pointer device class.

DETAILED DESCRIPTION

Embodiments discussed below relate to unified handling of pointer devices in a windowing environment. Discussion will begin with an overview of an example prior approach and limitations thereof. A windowing environment that allows applications to handle pointing devices and their inputs in a unified manner is then described, followed by discussion of example implementations.

Figure 1:
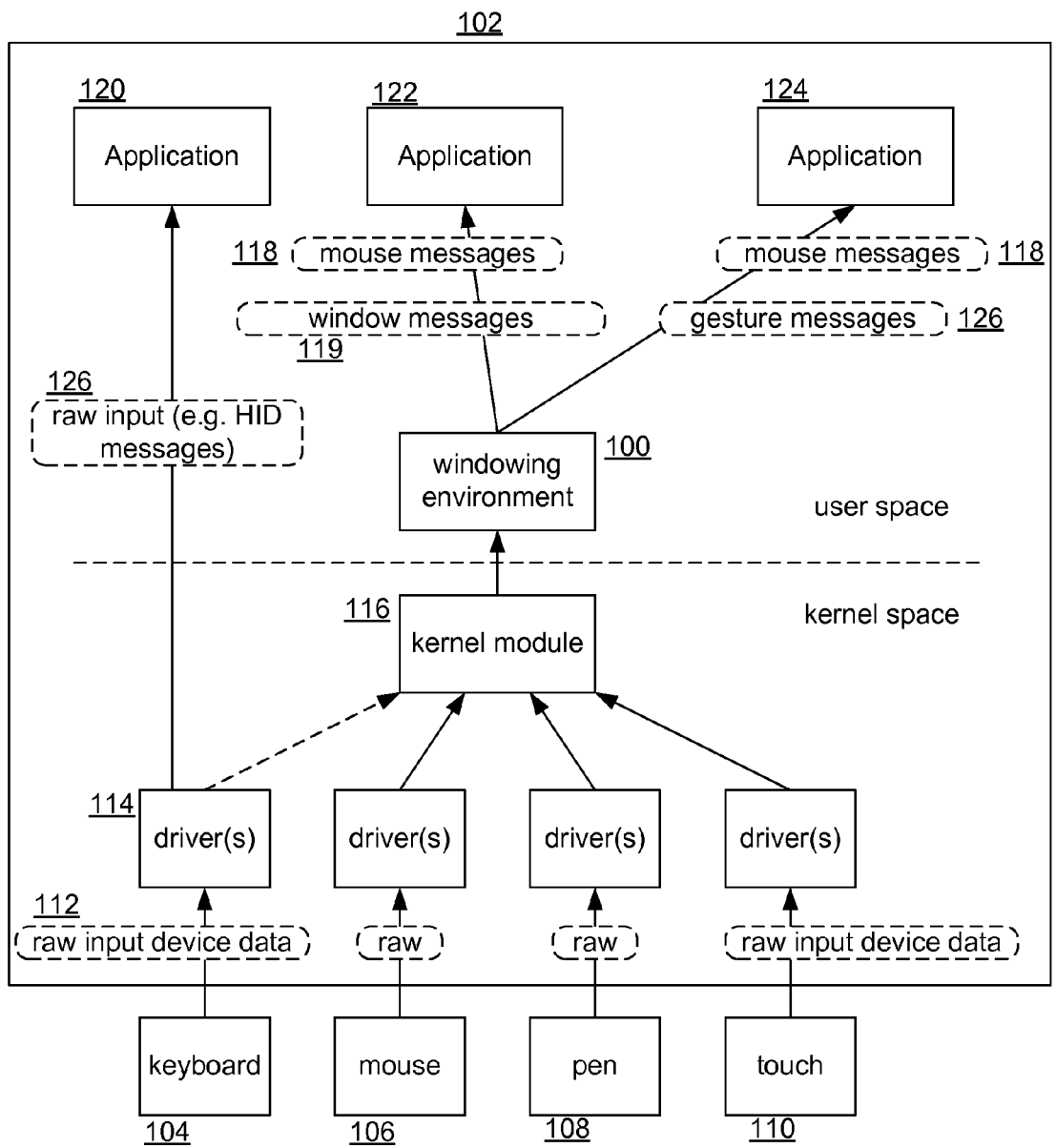
FIG. 1 shows a prior windowing environment on a computing device.

FIG. 1 shows a prior windowing environment 100 on a computing device 102. The windowing environment 100 may be any of a number of well-known windowing systems such as Microsoft Windows™, Apple OSX™, The X Window System, and others. Note that different operating systems may not have a kernel-user space distinction as shown in FIG. 1. The windowing environment 100 typically manages windows, sends window events to applications, handles input events from a human input device, and other functions well known in windowing environments for arbitrary applications.

The windowing environment 100 also may handle inputs from human input devices such as a keyboard 104, a mouse 106, a pen 108, a touch device 110, or any other human-operated input device. Of particular note are pointer-type input devices by which a user can specify arbitrary two or three-dimensional input points and other inputs. Input devices 104, 106, 108, 110 may pass raw input device data 112 up through respective driver stacks 114 to a kernel module 116, which may in turn pass input data to the windowing environment 100 which decides which applications to notify about which inputs or input-activated events.

The windowing environment 100 treats each input device as a separate and distinct data type. That is, the windowing environment 100 may have a different set of data types and interfaces for each type of input device. For example, the windowing environment 100 may have a mouse-specific API, a mouse object class, and may pass mouse-specific messages 118 to applications 120, 122, and 124 (the windowing environment 100 may also pass other window messages 119, e.g., refresh, minimize, move, resize, close, etc.). The windowing environment 100 may also pass touch-specific messages to applications 120, 122, and 124. In short, applications 120, 122, and 124, if they are to operate for any of the input devices 104, 106, 108, 110, must have different code to handle the different types of inputs, even in cases where the different types of input devices have semantic similarities such as with pointer devices.

The windowing environment 100 may also include gesture recognition functionality, possibly passing gesture recognition messages 128 to applications 120, 122, 124. However, if applications 120, 122, 124 are to deal with raw input 126 they may need additional code for handling raw input messages 126 received from driver stacks 114. Such raw input 126 may be unusable with native gesture-recognition functionality provided by the windowing environment 100, thus possibly requiring an application to forego using gesture recognition functions provided by windowing environment 100 and instead, disadvantageously, include custom-written gesture recognition code.

Figure 2:
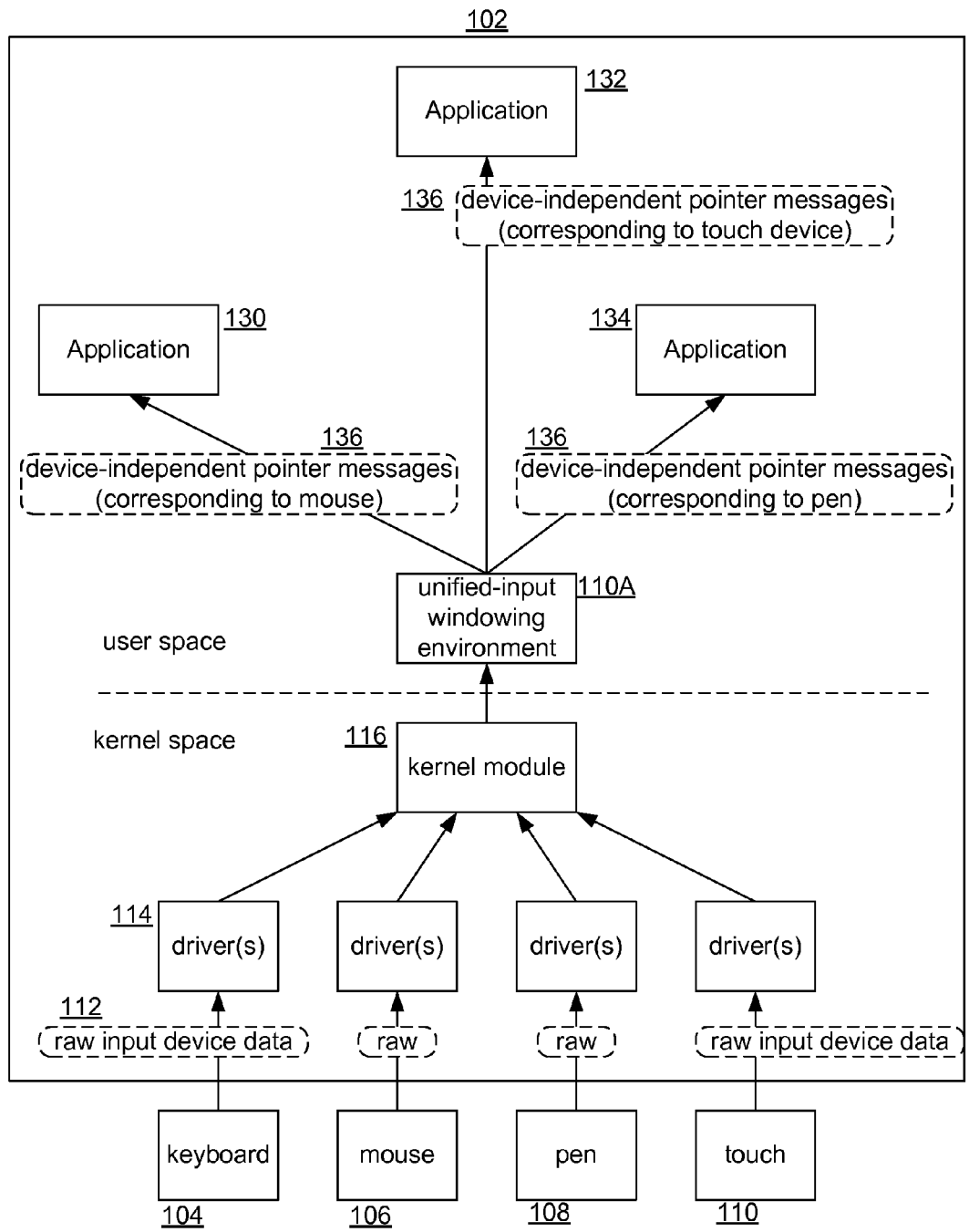
FIG. 2 shows the computing device with a unified-input windowing environment.

FIG. 2 shows the computing device 102 with a unified-input windowing environment 110A (any references to "windowing environment" hereafter will refer to the unified-input windowing environment 110A). The unified-input windowing environment 110A may receive input data passed up from driver stacks 114 according to input data from input devices 104, 106, 108, 110. The unified-input windowing environment 110A takes input generated from any pointer devices such as a mouse, a pen, a touch surface, or the like, and uses a common interface, messages, and data types (or classes) to communicate with applications 130, 132, 134. That is, regardless of the particular type of pointer device that was used by a user to provide interactive pointer input, the unified-input windowing environment 110A provides a unified set of constructs to allow the applications 130, 132, 134 to handle the input transparently without regard for the type of device used to provide the pointer input. Note that FIG. 2 is only an example configuration and in practice any application may receive inputs from any input device. Often, a user may swap between input devices while using a same application, and the inputs from those devices will be received by the application. For example, pointer messages 136 which are generally device-independent (or which may primarily carry device-independent input data) are sent to the applications 130, 132, 134 whether from a touch device, a pen device, a mouse, or other pointer device. In other words, as described in detail below, applications use the same code to handle pointer messages 136 for arbitrary types of pointer devices, for instance using the same data types (object classes), application programming interfaces (APIs), and other facilities that the unified-input windowing environment 110A may provide for applications to handle device-independent pointer messages 136, objects, events, and so forth.

Figure 3:
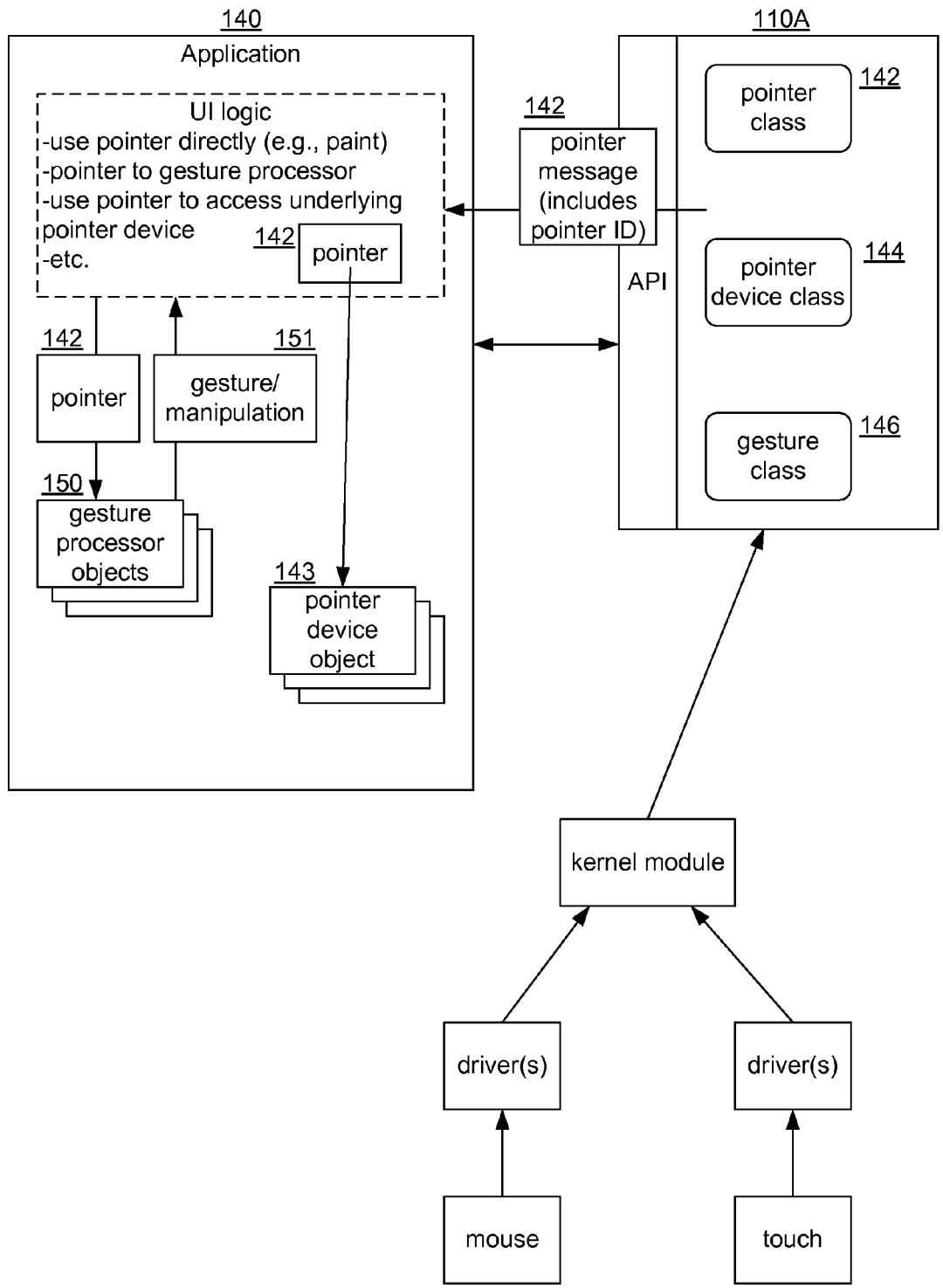
FIG. 3 shows an example of an application using the unified-input windowing environment.

FIG. 3 shows an example of an application 140 using the unified-input windowing environment 110A. The unified-input windowing environment 110A, in addition to managing arbitrary windows, may implement a pointer class 142, a pointer device class 144, and a gesture class 146. The application 140 may start by executing code to instantiate instances of the pointer class 142, the pointer device class 144, or the gesture class 146, as needed. The application 140 may also set up various event handlers to handle events and pointer messages 148 (as discussed below, embodiments may be implemented without object-oriented constructs). When a pointer message 148 (or event) is received, the UI logic of the application 140, for example, may use the pointer directly. For instance, if the application 140 has a painting area on which a user users an input pointer device to paint or draw, the application 140 may use x-y point data derived from the pointer message 148 to determine where to draw a stroke. If the logic of the application 140 requires information about the particular input pointer device that originated the pointer message 148, then the application 140 can use the pointer message 148 to obtain information such as what type of input device provided the input, what properties are supported by the input device, and so forth. For example, the pointer message 148 may have a property that is a pointer device object 143 for the corresponding pointing input device. As will be apparent when examples of classes are discussed below, the unified-input windowing environment 110A allows an application to deal with pointer inputs in a uniform manner and yet the application can go below the pointer inputs to access device-specific information when needed.

In addition, if the application 140 uses gestures, the pointer message 148 can be passed to an instance of a gesture processor 150 which may use information about the pointer message 148 (i.e., pointer input) to determine whether a gesture or manipulation has occurred. When a gesture or manipulation (e.g., an affine transformation) is identified, the gesture processor 150 in turn may signal the application 140 with an event or callback 151 indicating the identified gesture or manipulation.

While this description refers to classes, objects, event handlers, and other object-oriented constructs, these are only non-limiting examples used for convenience of explanation. Such examples are not to be taken as implying that any of the components or embodiments described herein are object-oriented or require an object-oriented environment. To the contrary, a windowing environment may well have no classes or other object-oriented constructs. Those skilled in the art of computer programming will appreciate that data structures, data types, messages, functions, and other non-object-oriented C-style constructs and APIs can be used with equal effect. Embodiments may also be implemented in simplified object-oriented environments such as Javascript™). Any use of "object" and "class" and related features such as methods and members will be understood, as used herein, as also describing implementations that use data structures and data types, functions, flat APIs, and the like, as the case may be. For example, the Win32™ module uses no classes per se. The companion User32™ module sends, for example, window messages (e.g., pointer messages) to applications, which in turn may process those messages using various associated functions. In sum, the embodiments described herein can be implemented in any type of programming environment using any type of programming language.

FIG. 4 shows an example of the pointer class 142. The pointer class 142 may have properties and methods as described in the Figure. In one embodiment, object instances of the pointer class 160 are obtained when an application receives an event notification. For example, the unified-input windowing environment 110A may provide various events for the pointer class 142 that may correspond to concepts of up inputs, move inputs, down inputs, and others. The application's corresponding event handlers may receive a set of event arguments which may include a property or method for accessing the corresponding pointer object (an instance of the pointer class 142). The application may in turn access the pointer object associated with a pointer event or pointer message. Thus any of the properties or methods shown in FIG. 4 are available to the application when the application is notified of or receives a pointer input. Pointers may also be implemented to concurrently support different frameworks handing pointer data back in a variety of coordinate systems, depending on what frame of reference is most helpful to a developer. Common coordinate systems include a client client's coordinates (relative to the application's window), screen coordinates, or coordinates relative to an element receiving the event.

FIG. 5 shows an example gesture class 146. An application may instantiate objects of the gesture class 146, and the instantiated objects may then be used as gesture recognition engines to recognize gestures from one or more pointer inputs (these may also be known as software-based gesture processors). In one embodiment, sets or vectors of pointer inputs may be passed to a gesture recognizer object. Timestamps, locations (points) of the pointer inputs or points, contact geometry (shape of a contact) may be used by gesture recognition algorithms (possibly configured using methods or properties of the gesture recognizing objects). Not all pointer inputs passed to a gesture recognizing object will necessarily result in a gesture or manipulation being recognized. In some cases, a gesture is recognized based on a set of recent pointer inputs stored in a history of a gesture object and a corresponding event (e.g., tap, hold, or other recognized manipulation or gesture) is then generated for the host application to handle according to its user interface logic.

Regardless of the type of pointer input device used (e.g., pen, mouse, touch surface, or other), the same gesture handling code may be used by the application. In addition, if necessary, the application may access information about the device associated with a pointer input to handle the input in a device-specific manner.

FIG. 6 shows an example of the pointer device class 144 for representing pointer devices. A pointer device object instance of the pointer device class 144 can be accessed by enumerating through the attached pointer devices using a method of a static pointer device class 144A. Or, a pointer device object can be accessed using a method or property of a pointer input object. In yet another embodiment, a pointer device object can be accessed by passing a pointer input identifier (see PointerId in FIG. 4) to the GetPointerDevice method of the static pointer class 144A.

As mentioned above, it may be desirable to provide the pointer class 142 with a property or field indicating whether a pointer is deemed to be a primary pointer. Various heuristics or rules may be used to determine whether a pointer device's input is primary. For example, a mouse device's inputs may always be considered primary to the exclusion of other device inputs. When multiple concurrent touches are presented by a touch input device, inputs from a first contact point may be given primary status. If a primary touch input is lifted and a second touch input remains down, even though a state is reached where there is not a current primary input, it is not until all touch contacts are determined to have ended (e.g., the second touch is lifted) that another new initial contact can become a new primary input. Note that the concept of a primary pointer can be tied to which input gets promoted to a legacy mouse construct, as described below.

In some cases so-called legacy applications that are not coded to work with the above-described pointer input model may nonetheless execute with the unified-input windowing environment 110A. In one embodiment, the unified-input windowing environment 110A probes a new application to determine if the application will recognize messages for the pointer input model, for instance sending unified-device messages. If an error occurs or there is no response, the unified-input windowing environment 110A may translate the pointer inputs into traditional mouse messages as described with reference to FIG. 1 (e.g., mouse events, mouse-specific objects, etc.). It is also possible that the application may have an environment setting that allows the unified-input windowing environment 110A to explicitly determine whether the application is a legacy application that cannot understand the unified pointer input model, which may also be mitigated by translating to older input formats that are suitable to the application (when such an environment setting is detected, probing may be avoided).

When translation occurs, the primary property may be used to identify which inputs are to be mouse inputs; other inputs may be handled as raw input or in other ways.

Figure 7:
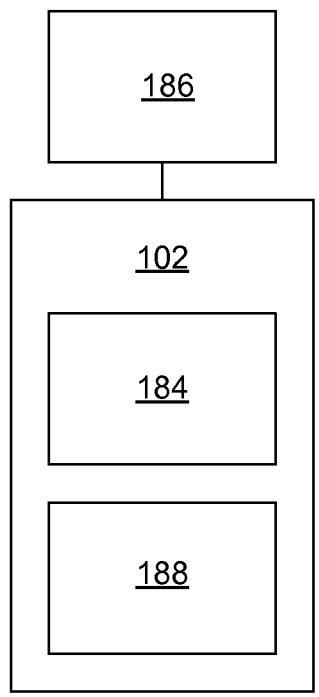
FIG. 7 shows additional details of the computing device.

FIG. 7 shows additional details of the computing device 102. The computing device 102 may be of any form such as a personal computer, a laptop computer, a workstation or server, a mobile device, smart phone, tablet, or the like. The computing device 102 may have physical storage 184 which may be static and/or volatile memory, magnetic or optical media, one or more hard disk drives, or a combination thereof. The computing device 102 may also have a display 186, either integrated with or connected with the computing device 102. The computing device 102 may also have any of a variety of processors 188 that cooperates with the storage 184 to implement embodiments described above.

CONCLUSION

As mentioned, embodiments and features discussed above can be realized in the form of information stored in volatile or non-volatile computer or device readable media. This is deemed to include at least media such as optical storage (e.g., compact-disk read-only memory (CD-ROM)), magnetic media, flash read-only memory (ROM), or any other means of storing digital information in a way that is convenient for use by a computer, but excluding signals and energy per se. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed.

The invention claimed is:

1. A method of managing pointer devices for a windowing environment executing on a computer, the windowing environment managing windows of arbitrary applications executing on the computer, the method comprising:
    providing an application programming interface (API) available to the arbitrary applications to obtain pointer messages from the windowing environment, the pointer messages comprising respective object instances of a generic pointer message class implemented by the windowing environment, the generic pointer message class defining a point property and a pointer device category property, wherein the generic pointer message class is not configured to be specific to any pointer device category, wherein each of the pointer messages comprises a point value in the point property and, in the pointer device category property, a pointer device category identifier that identifies a pointer device category of a pointer input device that sensed a point corresponding to the point value therein;
    generating a first pointer message by receiving a corresponding first point sensed by a first pointer input device connected and/or integrated with the computer, and, based on the first point, forming the first pointer message by including therein a first point value derived by the windowing environment from the first point and by selecting for the pointer device category property of the first pointer message a first pointer device category identifier identifying a first pointer device category to which the first pointer device belongs;

generating a second pointer message by receiving a corresponding second point sensed by a second pointer input device connected and/or integrated with the computer, and, based on the second point, forming the second pointer message by including therein a second point value derived by the windowing environment from the second point and by selecting for the pointer device category property of the second pointer message a second pointer device category identifier identifying a second pointer device category to which the second pointer belongs; and passing, by the windowing environment, to any given one of applications, the first and second pointer messages respectively corresponding to the first and second input points.

2. A method according to claim 1, wherein the windowing environment maps input points of any arbitrary category of input pointer device to pointer messages that are instances of the generic pointer message class such that an application coded to handle pointer messages is able to interact with any arbitrary category of pointer input device via such pointer messages.

3. A method according to claim 1, wherein the first pointer device category is a mouse device category, wherein the second device category is a touch device category, wherein the first pointer device comprises a mouse, wherein the second pointer device comprises a touch-sensitive surface.

4. A method according to claim 3, wherein the generic pointer message class is used by the windowing system to provide pointer messages that are instances of the generic pointer message class for arbitrary categories of input pointer devices connected with the computer.

5. A method according to claim 1, further comprising passing, by the applications, some of the pointer messages or data therefrom to gesture processing objects executing on the computer and receiving, by the applications, from the gesture processing objects, indicia of gestures recognized by the gesture processing objects according to the pointer messages or the data therefrom.

6. A method according to claim 1, wherein the generic pointer message class further defines a device identifier property, and the applications use the device identifier property to obtain device identifiers of the first and second pointer input devices.

7. A method according to claim 6, wherein the device identifiers are passed by the applications to the windowing environment which responds with properties of or objects representing the first and second pointer input devices.

8. A method according to claim 1 wherein the windowing environment further implements a pointer device class, the method further comprising the given one of the applications receiving a third pointer message, wherein the first, second, and third pointer messages all comprise object instances of the generic pointer message class, the generic pointer message class further comprising a device property comprising an instance of the pointer device class, the instance of the pointer device class having values that are specific to a corresponding pointer human device.

9. One or more computer-readable storage medium storing information to enable a computing device to perform a process, the computing device comprising a processor, a display, a first pointer device, and a second pointer device, where the first pointer device is in a first category of pointer devices and the second pointer device is in a second category of pointer devices, the process comprising:

executing a windowing environment that manages windows of applications executing on the computing device;

receiving, by the windowing environment, first raw input points outputted from the first pointer device and second raw input points outputted from the second pointer device;

generating, by the windowing environment, first input pointers comprised of points respectively corresponding to the first raw input points, and second input pointers respectively corresponding to the second raw input points, respectively, the first and second input pointers comprising instances of a same input pointer data type or a same message type implemented by the windowing environment, wherein the input pointer data type or message type is generic with respect to categories of pointer devices including at least the first and second categories of pointer devices, and wherein each input pointer comprises a category identifier identifying a category of pointer devices selected according to a pointer device that outputted a corresponding raw input point, the input pointer data type or message type used by the windowing environment to convey points outputted by pointer devices of arbitrary different categories of pointer devices; and passing the input pointers to the applications.

10. One or more computer-readable storage medium according to claim 9, wherein some of the input pointers correspond to a first contact of the first pointer device and some of the input pointers correspond to a second contact of the first pointer device, the first and second contact concurrently contacting the first pointer device.

11. One or more computer-readable storage medium according to claim 10, the process further comprising a first application receiving some of the input pointers and a second application receiving some of the input pointers, and wherein the first application uses a first received input pointer to obtain a first pointer device object representing the first pointer device and uses a second received input pointer to obtain a second pointer device object representing the second pointer device.

12. One or more computer-readable storage medium according to claim 9, wherein the first pointer device comprises a mouse and the second pointer device comprises a touch surface, the process further comprising a first application passing a pointer input corresponding to the mouse to a first gesture detection module and passing a pointer input corresponding to the touch surface to a second gesture detection module, the gesture detection modules recognizing corresponding gestures and providing indicia thereof to the first application, wherein the category identifier of the pointer input passed to the first application identifies a mouse category and the category identifier of the pointer input passed to the second application identifies a touch category.

13. One or more computer-readable storage medium according to claim 9, wherein the applications use a same application programming interface of the windowing environment to obtain the pointer inputs, the process further comprising one of the applications that receives a pointer input: passing the pointer input or information obtained therefrom to the application programming interface and receiving in return information about a corresponding one of the pointer devices.

14. One or more computer-readable storage medium according to claim 9, wherein the pointer data type or message type comprises button states, and the process further comprises mapping, by the windowing environment, a button of the first pointer device to one of the button states and mapping a contact of the second pointer device to one of the button states.

15. One or more computer-readable storage medium according to claim 14, wherein pointer inputs derived from contacts with a touch pointer device comprise information indicating shapes of the contacts.

16. One or more computer-readable storage medium according to claim 15, wherein pointer inputs derived from a mouse pointer device have values in the their respective contact properties that indicate whether a button of the mouse was pressed, and wherein pointer inputs derived from a touch pointer device have values in their respective contact properties that indicate whether a contact with the touch pointer device has a pressed-down state.

17. A computing device comprising:
a processor, storage, display, a first pointer input device and a second pointer input device of a pointer device category that is different than a pointer device category of the first pointer input device, each pointer input device configured to sense and generate input points;
the storage storing a windowing system configured to receive and manage the input points and manage windows for arbitrary applications on the computing device, the windowing system implementing a generic pointer message class configured to convey to applications corresponding pointer messages for the first and second pointer device categories, the generic pointer message class comprising pointer data properties that each correspond to a respective type of data provided by each pointer device in each category of pointer devices, the properties further including a pointer device category property; and
the windowing system further configured to, when executing by the processor, according to the input points generated by user physical manipulations of the first pointer input device and the second pointer input device, generate respective pointer messages that comprise instances of the generic pointer message class, each of the pointer messages having each of the pointer data properties which are populated with corresponding values that vary according to the corresponding physical manipulations of the first and second pointer input devices based on the input points, wherein each pointer message is generated by determining the pointer device category of the corresponding pointer input device and setting the pointer device category property accordingly, and wherein the pointer messages, including a first pointer message corresponding to the first pointer input device and a second pointer message corresponding to the second pointer input device, are configured to be received by an application.

18. A computing device according to claim 17, wherein the pointer messages have a primary property indicating whether the respective pointer messages are primary pointer messages.

19. A computing device according to claim 17, wherein the primary properties are used to determine which pointer messages are promoted to mouse messages.

20. A computing device according to claim 18, wherein the windowing system automatically determines which pointer messages will be designated as primary pointer messages.

* * * * *